(12) United States Patent
Alapati et al.

(10) Patent No.: US 11,941,654 B2
(45) Date of Patent: *Mar. 26, 2024

(54) AUTOMATED TRANSACTIONAL OFFERS USING A BROWSER EXTENSION

(71) Applicant: American Express Travel Related Services Company, Inc., New York, NY (US)

(72) Inventors: Suman Babu Alapati, Phoenix, AZ (US); William H. Bishop, Phoenix, AZ (US); Anoop Kanippayyur, Phoenix, AZ (US); Rakesh Pattanayak, Phoenix, AZ (US); Avishekh Kumar Tewari, Mesa, AZ (US); Tejaswi Upadhyaya, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/684,029

(22) Filed: Mar. 1, 2022

(65) Prior Publication Data

US 2022/0188855 A1 Jun. 16, 2022

Related U.S. Application Data

(63) Continuation of application No. 16/384,416, filed on Apr. 15, 2019, now Pat. No. 11,282,103.

(51) Int. Cl.
*G06Q 30/00* (2023.01)
*G06F 16/955* (2019.01)
*G06Q 30/0207* (2023.01)

(52) U.S. Cl.
CPC ..... *G06Q 30/0222* (2013.01); *G06F 16/9566* (2019.01); *G06Q 30/0236* (2013.01)

(58) Field of Classification Search
CPC ............ G06Q 30/0222; G06Q 30/0236; G06F 16/9566
See application file for complete search history.

(56) References Cited

U.S. PATENT DOCUMENTS 10,580,027 B1  3/2020  Rephlo
2002/0046109 A1  4/2002  Leonard et al.
(Continued)

OTHER PUBLICATIONS

R. Abdellaoui and M. Pasquet, "Secure Communication for Internet Payment in Heterogeneous Networks," 2010 24th IEEE International Conference on Advanced Information Networking and Applications, Perth, WA, Australia, 2010, pp. 1085-1092, doi: 10.1109/AINA.2010.45. (Year: 2010).*

(Continued)

*Primary Examiner* — Sun M Li

(57) ABSTRACT

Systems and methods for automated transactional offers are disclosed. In one embodiment, a system can be configured to register a uniform resource locator (URL) of a merchant system as a verified merchant URL. An extension communication can be received from a browser extension executed on a client device. A captured merchant URL and a user account of a user can be determined based on the extension communication. A merchant ID is associated with the captured merchant URL is determined based on a comparison of the captured merchant URL and a plurality of verified merchant URLs. An available offer is retrieved based on the merchant ID. The available offer is displayed on the client device. An offer enrollment request from the browser extension of the client device is received. A user offer enrollment is transmitted to an issuer system.

20 Claims, 5 Drawing Sheets

(56) References Cited

U.S. PATENT DOCUMENTS

| | | | |
|---|---|---|---|
| 2009/0187462 A1* | 7/2009 | Gevelber | G06Q 30/02 705/14.18 |
| 2009/0292599 A1 | 11/2009 | Rampell et al. | |
| 2010/0179872 A1 | 7/2010 | Fujita et al. | |
| 2011/0010352 A1 | 1/2011 | Jockisch et al. | |
| 2011/0125565 A1* | 5/2011 | MacIlwaine | G06Q 30/0273 705/14.1 |
| 2012/0101881 A1* | 4/2012 | Taylor | G06Q 30/04 705/14.36 |
| 2013/0013499 A1* | 1/2013 | Kalgi | G06Q 20/36 705/41 |
| 2013/0211890 A1 | 8/2013 | Heitmueller et al. | |
| 2013/0311286 A1* | 11/2013 | Detwiler | G06Q 30/0261 705/14.54 |
| 2013/0332253 A1* | 12/2013 | Shiffert | G06Q 30/0255 705/14.26 |
| 2013/0332284 A1 | 12/2013 | Faith et al. | |
| 2015/0006426 A1 | 1/2015 | Sobhani et al. | |
| 2018/0225694 A1* | 8/2018 | Shiffert | G06Q 30/0269 |
| 2019/0122246 A1* | 4/2019 | Shiffert | G06Q 30/0269 |

OTHER PUBLICATIONS

G. Varshney, S. Bagade and S. Sinha, "Malicious browser extensions: A growing threat: A case study on Google Chrome: Ongoing work in progress," 2018 International Conference on Information Networking (ICOIN), Chiang Mai, Thailand, 2018, pp. 188-193, doi: 10.1109/ICOIN.2018.8343108. (Year: 2018) (Year: 2018).*

G. Varshney, S. Bagade and S. Sinha, "Malicious browser extensions: A growing threat: A case study on Google Chrome: Ongoing work in progress," 2018 International Conference on Information Networking (ICOIN), Chiang Mai, Thailand, 2018, pp. 188-193, doi: 10.1109/ICOIN.2018.8343108. (Year: 2018).*

L. Kyrillidis, K. Mayes, B. Chazalet and K. Markantonakis, "Card-Present Transactions on the Internet Using the Smart Card Web Server," 2013 12th IEEE International Conference on Trust, Security and Privacy in Computing and Communications, 2013, pp. 611-619, doi: 10.1109/TrustCom.2013.75. (Year: 2013).*

* cited by examiner

US 11,941,654 B2

AUTOMATED TRANSACTIONAL OFFERS USING A BROWSER EXTENSION

CROSS REFERENCE TO RELATED APPLICATIONS

This application claims priority to, and the benefit of, U.S. Ser. No. 16/384,416, filed on Apr. 15, 2019 and entitled "AUTOMATED TRANSACTIONAL OFFERS USING A BROWSER EXTENSION," which is hereby incorporated by reference in its entirety for all purposes.

FIELD

The present disclosure relates to transactional offers and promotions, and more specifically, to systems and methods for automated transactional offers using a browser extension.

BACKGROUND

Users may initiate transactions with a merchant using various methods. For example, a user may initiate and complete transactions online via a web browser. Users may use a transaction account to provide payment for the transaction.

Transaction account issuers, payment networks, merchants, and similar entities may provide offers and promotions to encourage the user to initiate and complete transactions. However, users may be unaware of available offers or promotions that may be applied before initiating or completing the transaction.

A technical problem is that reviewing available offers or promotions may require the user to separately navigate to websites, information portals, or the like hosted by the transaction account issuer, payment network, and/or merchant.

SUMMARY

Systems, methods, and articles of manufacture (collectively, the "system") for accessing available offers and promotions for users through a browser extension are disclosed. The system may receive an extension communication comprising a merchant uniform resource locator (URL) and an offer ID. The system may determine a merchant ID associated with the merchant URL. The system may retrieve an available offer based on the merchant ID. The system may transmit the available offer to a user device.

In various embodiments, the system may determine user account data associated with the offer ID. The system may receive an offer enrollment request from the user device, wherein the offer enrollment request is based on the available offer and includes the offer ID. The system may generate a user offer enrollment comprising the available offer and at least one of the offer ID or the user account data. The system may transmit the user offer enrollment to an issuer system. In response to receiving the user offer enrollment, the issuer system may associate the available offer with the user account data. The system may associate the available offer with a merchant, wherein in response to the user device completing a transaction with the merchant, the issuer system may apply the available offer to the transaction before processing the transaction. The system may generate the extension communication using an offer browser extension on the user device in response to the user device navigating to the merchant URL. The system may store the offer ID in the offer browser extension, wherein the offer ID may be generated by an issuer system during a registration process to associate user account data with the offer ID.

In various embodiments, the system may retrieve an extension communication, wherein the extension communication comprises an offer ID. The system may retrieve at least one of an available promotion or user account payment data based on the offer ID, wherein the user account payment data is associated with the offer ID. The system may transmit at least one of the available promotion or the user account payment data to a user device.

In various embodiments, the system may retrieve user account payment data from an issuer system, wherein the issuer system may determine the user account payment data based on user account data associated with the offer ID. The system may generate the extension communication by an offer browser extension on the user device in response to the user device accessing a web browser. The system may store the offer ID in the offer browser extension, wherein the offer ID may be generated by the issuer system during a registration process to associate user account data with the offer ID. The user account payment data may comprise at least one of an account balance, a payment due date, a payment minimum amount, or a payment statement balance. The available promotion may comprise a new account offering or a lending offer.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
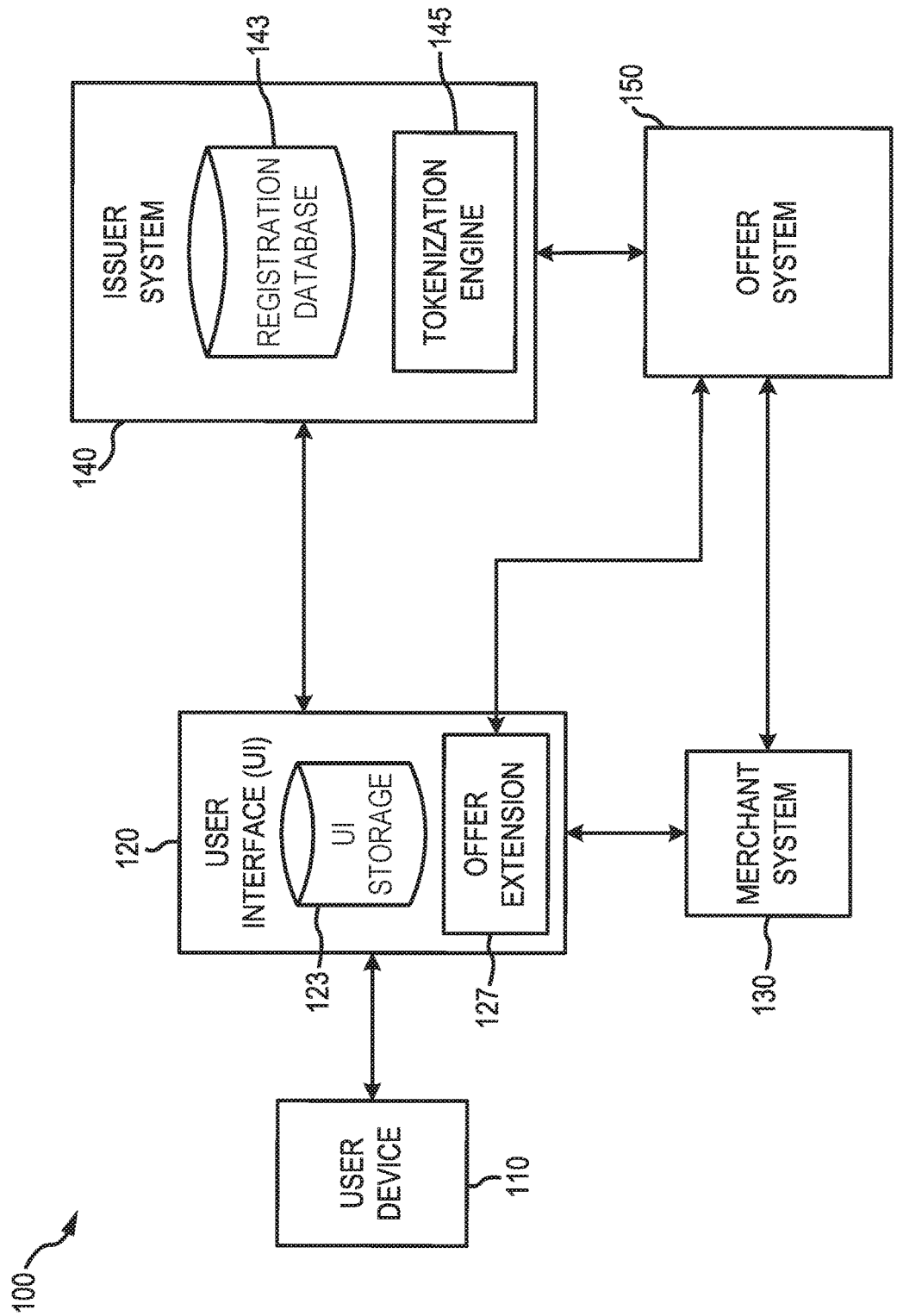
FIG. 1 is a block diagram illustrating a system for automated transactional offers, in accordance with various embodiments.

In various embodiments, systems and methods for automated transactional offers are disclosed. The system may allow users (e.g., a transaction account user, holder, beneficiary, etc.) to enroll in an automated transactional offer, without needing to navigate to separate websites or informational repositories to search for and/or review available offers. In that regard, the system may provide a technical solution to the technical problem of users being unaware of offers in typical transactional and offer-based systems.

For example, the user may interact online with a merchant's website. In response to the user navigating to the merchant's website, the system may retrieve available automated transactional offers and display the automated transactional offers to the user. In response to the user selecting or enrolling in an automated transactional offer, the system may apply the automated transactional offer to the user's associated transaction account. In response to the user completing the transaction with the merchant, the enrolled automated transactional offer may be applied when settling the transaction.

As discussed further herein, an automated transactional offer may comprise an offer, a promotion, and/or the like. The automated transactional offer may be made available by the merchant, a transaction account issuer, and/or any other desired party. In various embodiments, an offer may comprise a rebate, a discount on the transaction, a discount on an item, a cash-back, a rewards offer, an item itself and/or any other suitable or desired type of offer. An "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The offer may be a general offer (e.g., available for any transaction with the merchant) or may be specific to an item (e.g., good and/or service) provided by the merchant. The offer may also comprise offer terms, such as, for example, an expiration date, a minimum transaction amount, and/or the like. The offer may also be personalized to the user (e.g., a personalized offer) such as, for example, providing offers based on a users's historical transactions, visits to the merchant website, and/or the like.

In various embodiments, a promotion may comprise a payment due notification, a new account offering, a lending offer, and/or any other suitable or desired type of promotion. For example, the payment due notification may prompt the user that a payment on the user's transaction account is due, and may comprise data indicating the due date, an offer system account balance, a minimum payment amount, and/or the like. The new account offering may comprise data indicating a new transaction account type available to the user (e.g., a rewards credit card, a high-interest savings account, etc.). The lending offer may comprise data indicating a new lending offer available to the user, such as, for example, a loan, a financing offer, and/or the like. The new account offering and/or the lending offer may be general (e.g., a new account type or lending offer available from the issuer system) or may be user specific (e.g., the user is preapproved for a given account type or lending offer).

In various embodiments, the system may therefore provide a convenient process for customers to enroll in offers and promotions without needing to navigate separately to issuer system websites, offer repositories, or third party websites. In that respect, the system may increase user satisfaction and engagement with merchants and the transaction issuer system. For example, the user may conveniently select and enroll in available offers and promotions, in contrast to typical processes requiring the user to separately navigate to other websites to determine available offers and promotions.

In various embodiments, the system further improves the functioning of the computer. For example, by the user enrolling in an automated transactional offer (as opposed to manually navigating and inputting data to learn about available offers or promotions), the user performs less computer functions and provides less input, which saves on data storage and memory which speeds processing. Additionally, by transmitting, storing, and accessing data using the processes described herein, the security of the data is improved, which decreases the risk of the computer or network from being compromised. For example, the system may implement a browser extension configured to communicate with an offer system to enroll the user in available automated transactional offers. The system may authenticate the user through a login process, generate a unique identifier, and store the unique identifier in the browser extension. The unique identifier may serve to authenticate and authorize the user throughout the system, such that the user does not need to continually resubmit login credentials, transaction account information, and similar sensitive data. By storing the unique identifier in the browser extension (e.g., browser storage), the user may be able to seamlessly interact with data and services protected by user authorization. Decreasing the need for user's to submit sensitive data may improve the security of the sensitive data, and may decrease the potential for security breaches, phishing attacks, and the like. Further, decreasing the need for user's to resubmit login information may also enable users to retrieve data from multiple sources during a single login and/or registration process, which may save time, processing power, and/or data usage.

In various embodiments, and with reference to FIG. 1, a system 100 for automated transactional offers is disclosed. System 100 may comprise a user device 110, a user interface (UI) 120, a merchant system 130, an issuer system 140, and/or an offer system 150. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, user device 110 may be configured enable a user to interact with system 100 to complete transactions and enroll in offers and promotions. For example, user device 110 may be configured to enable the user to register for a browser extension, initiate and complete enrollment in an offer or promotion, and/or the like. User device 110 may be in electronic communication with UI 120. User device 110 may comprise one or more hardware, software, and/or database components capable of sending, receiving, and storing data. For example, user device 110 may comprise a personal computer, such as, for example, a desktop computer, a laptop computer, or the like, and/or any other suitable device capable of interacting with a web browser. User device 110 may comprise an operating system such as, for example, a WINDOWS® operating system, APPLE® IOS®, a BLACKBERRY® operating system, a LINUX® operating system, and the like. User device 110 may also comprise software components installed on user device 110 and configured to allow via user device 110 access to various systems, services, and components in system 100. For example, user device 110 may comprise a web browser (e.g., MICROSOFT INTERNET EXPLORER®, GOOGLE CHROME®, etc.), an application, a micro-app, or the like configured to allow user device 110 to access various systems, services, and components in system 100.

In various embodiments, UI 120 may be configured to provide a web-based interface configured to enable a user to access and interact with various components of system 100. For example, UI 120 may be configured to allow the user to interact with merchant system 130 to initiate and/or complete transactions. UI 120 may also be configured to allow the user to interact with issuer system 140 to register for automated transactional offers, as discussed further herein. UI 120 may also be configured to allow the user and user device 110 access to offer system 150 to review and enroll in available offers and promotions, as discussed further herein. UI 120 may be in electronic communication with user device 110, merchant system 130, issuer system 140, and/or offer system 150. UI 120 may include a graphical user interface ("GUI"), software modules, logic engines, various databases, interfaces to systems and tools, and/or computer networks. UI 120 may comprise a web browser, such as, for example, MICROSOFT INTERNET EXPLORER®, GOOGLE CHROME®, MOZILLA FIREFOX®, and/or any other suitable or desired extendable web browser). In various embodiments, UI 120 may comprise one or more software and/or database components. For example, UI 120 may comprise a UI storage 123 and/or an offer extension 127.

In various embodiments, UI storage 123 may comprise a database, data structure, or the like capable of storing and maintaining data. For example, UI storage 123 may comprise an internal repository of UI 120, and may be configured to store browser data, cookies, downloaded files, and/or the like. In various embodiments, UI storage 123 may be configured to store and maintain an offer ID associated with the user, as discussed further herein. In various embodiments, offer extension 127 may be configured to provide automated transactional offers to the user (e.g., via UI 120 and/or user device 110), as discussed further herein. Offer extension 127 may comprise one or more software and/or database components. For example, offer extension 127 may comprise a browser extension, web service, API, SDK, or the like configurable in UI 120. In various embodiments, user device 110 may receive an installation package from issuer system 140. The installation package may allow user device 110 to install offer extension 127 into UI 120. In various embodiments, offer extension 127 may be downloaded and installed by user device 110 as part of a registration process (e.g., a registration for automated transactional offers). In various embodiments, offer extension 127 may also be downloaded and installed by user device 110 prior to the registration process, after the registration process, or at any other suitable time. As discussed further herein, offer extension 127 may be operable in response to a user logging in to offer extension 127 (e.g., in response to a user inputting user credentials), and in response to offer extension 127 receiving and storing an offer ID associated with the user.

Figure 2:
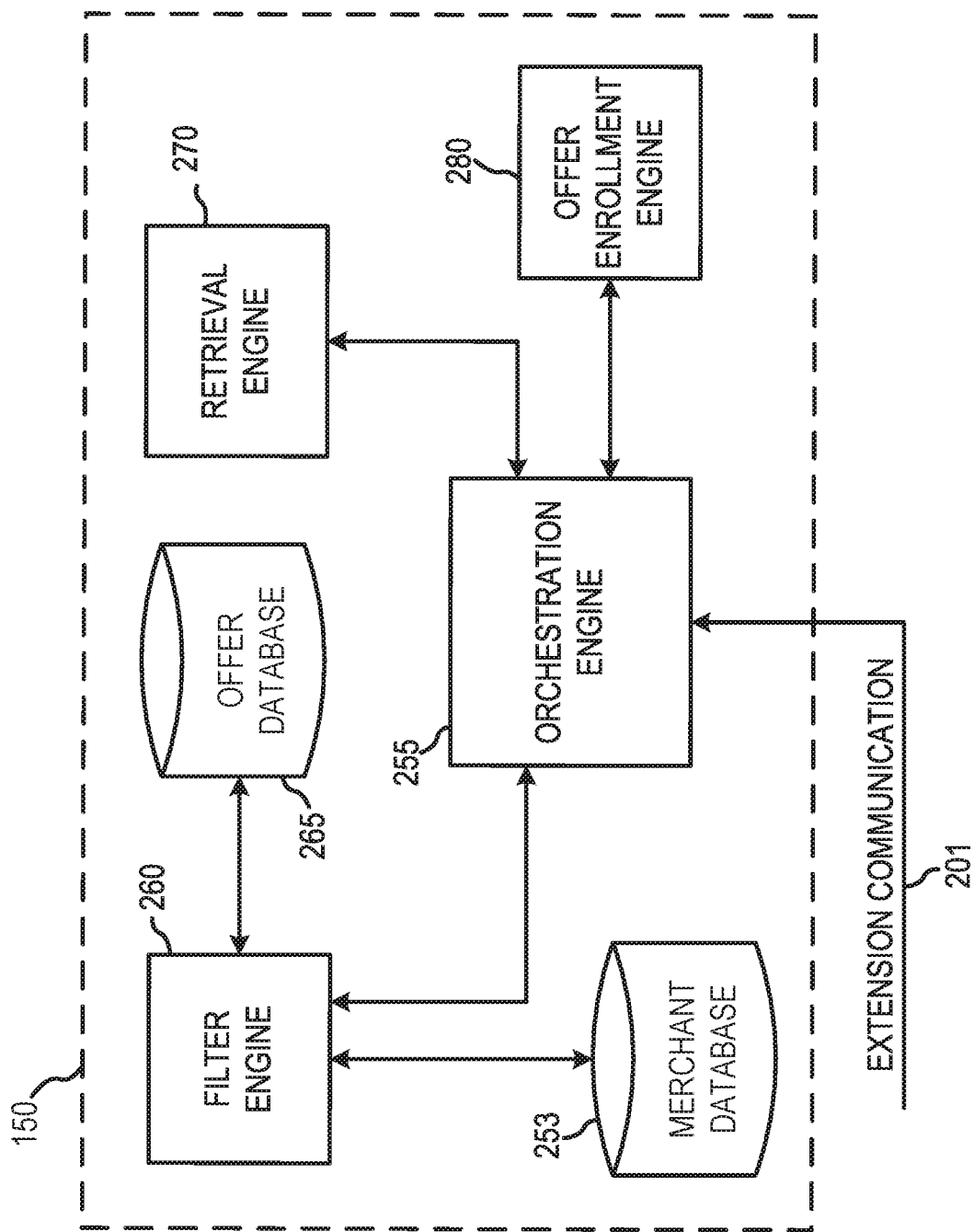
FIG. 2 is a block diagram illustrating an exemplary offer system for use in a system for automated transactional offers, in accordance with various embodiments.

In various embodiments, merchant system 130 may be in electronic communication with UI 120 and/or offer system 150. Merchant system 130 may be configured to enable a merchant to receive transaction requests from a user, submit transaction authorization requests to a payment network and/or issuer system to authorize the transaction, and/or to interact with the user to sell or offer goods and/or services. Merchant system 130 may also be configured to interact with offer system 150 to register merchant system 130 as being available for automated transactional offers. For example, merchant system 130 may transmit a merchant registration request to offer system 150. The merchant registration request may comprise a merchant ID, one or more merchant URLs that merchant system 130 desires to register, available offers, and/or the like. As discussed further herein, offer system 150 may store the merchant URLs in a merchant database 253 (with brief reference to FIG. 2), to be used when retrieving available offers.

Merchant system 130 may incorporate one or more hardware, software, and/or database components. For example, merchant system 130 may comprise one or more network environments, servers, computer-based systems, processors, databases, datacenters, and/or the like. In various embodiments, merchant system 130 may be computer based, and may comprise a processor, a tangible non-transitory computer-readable memory, and/or a network interface, along with other suitable system software and hardware components. Instructions stored on the tangible non-transitory memory may allow merchant system 130 to perform various operations, as described herein.

In various embodiments, issuer system 140 may comprise or interact with a transaction account issuer, a traditional payment network, and/or a transaction network to facilitate transactions and payments, authorize transactions, settle transactions, provide offers and promotions, and the like. For example, issuer system 140 may represent existing proprietary networks that presently accommodate transactions for credit cards, debit cards, and/or other types of transaction accounts or transaction instruments. Issuer system 140 may be in electronic communication with UI 120 and/or offer system 150. Issuer system 140 may be a closed network that is secure from eavesdroppers. In various embodiments, issuer system 140 may comprise an exemplary transaction account issuer and/or transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, issuer system, or the like.

Issuer system 140 may include systems and databases related to financial and/or transactional systems and processes, such as, for example, one or more authorization engines, authentication engines and databases, settlement engines and databases, accounts receivable systems and databases, accounts payable systems and databases, and/or the like. In various embodiments, issuer system 140 may also comprise a transaction account issuer's Credit Authorization System ("CAS") capable of authorizing transactions, as discussed further herein. Issuer system 140 may be configured to authorize and settle transactions, and maintain transaction account member databases, accounts receivable databases, accounts payable databases, or the like.

Although the present disclosure makes reference to issuer system 140, it should be understood that principles of the present disclosure may be applied to a system for automated transactional offers having any suitable number of payment networks and/or issuer systems. For example, system 100 may comprise one or more issuer systems 140, each corresponding to or associated with a different issuer system or network.

In various embodiments, issuer system 140 may comprise one or more software and/or hardware components configured to aid in the automated transactional offering process. For example, issuer system 140 may comprise a registration database 143 and/or a tokenization engine 145.

In various embodiments, registration database 143 may be configured to store and maintain user registrations for automated transactional offers. For example, issuer system 140 may receive an automated offer registration request from the user. The automated offer registration request may comprise user identifying data (e.g., username, password, biometric input, knowledge based authentication (KBA), etc.), a registration account (e.g., the transaction account the user wants to register for use), interface data (e.g., the type of browser), and/or the like. Issuer system 140 may authenticate and authorize the user and store the automated offer registration request data in registration database 143. As discussed further herein, issuer system 140 may also be configured to generate an offer ID unique to the user, and may store the offer ID in registration database 143 associated with the automated offer registration request data. Registration database 143 may comprise any suitable database, data structure, table, or the like.

In various embodiments, tokenization engine 145 may be configured to generate the offer ID during an automated offer registration process. Tokenization engine 145 may generate the offer ID using any suitable process or technique. The offer ID may comprise a unique identifier, token, public guID, or the like identifying the user registering for automated transactional offers. In various embodiments, the offer ID may also be encrypted, using any suitable encryption process. Tokenization engine 145 may comprise any suitable hardware, software, and/or database components capable of generating the offer ID.

In various embodiments, offer system 150 may be configured to provide automated transactional offers to users, enroll users in selected offers and/or promotions, and/or the like, as discussed further herein. Offer system 150 may be in electronic communication with UI 120, merchant system 130, and/or issuer system 140. Offer system 150 may comprise one or more hardware, software, and/or database components. For example, offer system 150 may comprise one or more network environments, servers, computer-based systems, processors, databases, and/or the like. Offer system 150 may comprise at least one computing device in the form of a computer or processor, or a set of computers/processors, although other types of computing units or systems may be used such as, for example, a server, web server, pooled servers, or the like. Offer system 150 may also include software, such as services, APIs, SDKs, and the like, configured to perform various tokenization operations discussed herein. In various embodiments, offer system 150 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, offer system 150 may comprise one or more software, hardware, and/or database components configured to aid in providing automated transactional offers. For example, in accordance with various embodiments and with reference to FIG. 2, offer system 150 may comprise a merchant database 253, an orchestration engine 255, a filter engine 260, an offer database 265, a retrieval engine 270, and/or an offer enrollment engine 280. Each offer system 150 component may comprise various hardware, software, and/or databases.

In various embodiments, merchant database 253 may be configured to store and maintain verified merchant URLs. For example, during a merchant registration process, merchant system 130 (with brief reference to FIG. 1) may transmit to offer system 150 one or more merchant URLs to be registered as providing automated transactional offers. In response to completing the merchant registration, offer system 150 may store the verified merchant URLs and an associated merchant ID in merchant database 253. Merchant database 253 may comprise any suitable database, data structure, and/or the like.

In various embodiments, orchestration engine 255 may be configured to control and orchestrate communications in offer system 150. For example, orchestration engine 255 may be configured to receive an extension communication 201 from offer extension 127, with brief reference to FIG. 1. The extension communication 201 may comprise an offer ID and a merchant URL. In response to receiving the extension communication 201, orchestration engine 255 may invoke one or more offer system 150 components to determine the merchant ID associated with the merchant URL, retrieve available offers based on the merchant ID, transmit the available offers for user review, receive offer enrollment requests from the user, and complete user enrollment in the offer, as discussed further herein.

In various embodiments, filter engine 260 may be configured to query merchant database 253 to retrieve a merchant ID associated with a verified merchant URL, as discussed further herein. Filter engine 260 may also be configured to query offer database 265 to retrieve one or more available offers based on the retrieved merchant ID. Filter engine 260 may be configured to transmit the retrieved data to orchestration engine 255.

In various embodiments, offer database 265 may be configured to store and maintain automated transactional offers. For example, offer database 265 may be configured to store offers and promotions, as previously discussed. Offer database 265 may comprise any suitable database, data structure, and/or the like.

In various embodiments, retrieval engine 270 may be configured to retrieve user account data associated with the offer ID received in the extension communication 201. For example, retrieval engine 270 may be in electronic communication with issuer system 140, with brief reference to FIG. 1. Retrieval engine 270 may transmit the offer ID to issuer system 140, and issuer system 140 may return data associated with the user matching the offer ID, such as, for example, a user transaction account (e.g., the full account number, the last 4 digits, an abbreviated account number, a LUPC, etc.), user billing address, user shipping address or preferences, and/or the like. In various embodiments, offer enrollment engine 280 may be configured to enroll a user in a selected offer and/or promotion. For example, in response to a user accepting or enrolling in an available offer or promotion, orchestration engine 255 may instruct offer enrollment engine 280 to generate a user offer enrollment. The user offer enrollment may comprise the user account data, the available offer, and the merchant ID. Offer enrollment engine 280 may be in electronic communication with issuer system 140, with brief reference to FIG. 1. Offer enrollment engine 280 may transmit the user offer enrollment to issuer system 140, and issuer system 140 may complete the enrollment process.

Figure 3:
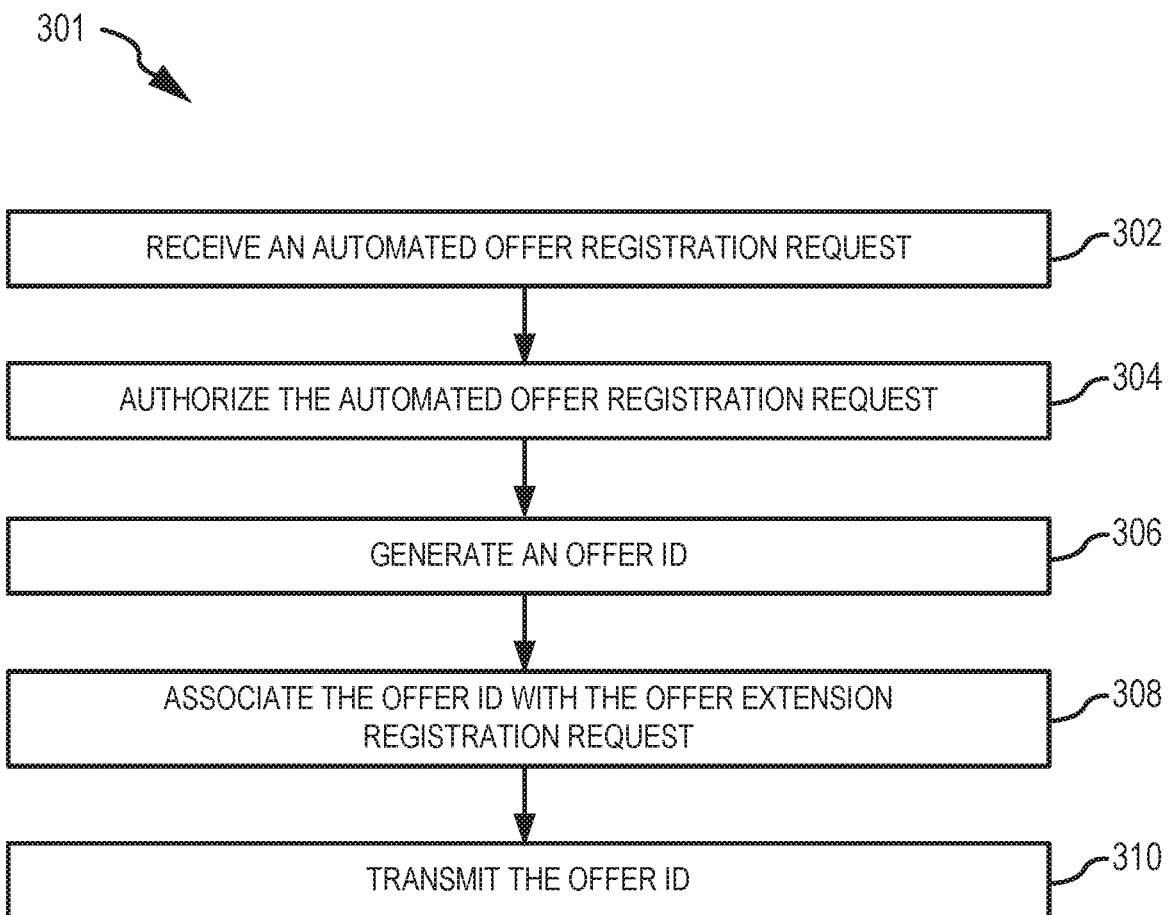
FIG. 3 illustrates a process flow for a method of registering for automated transactional offers, in accordance with various embodiments.
Figure 4:
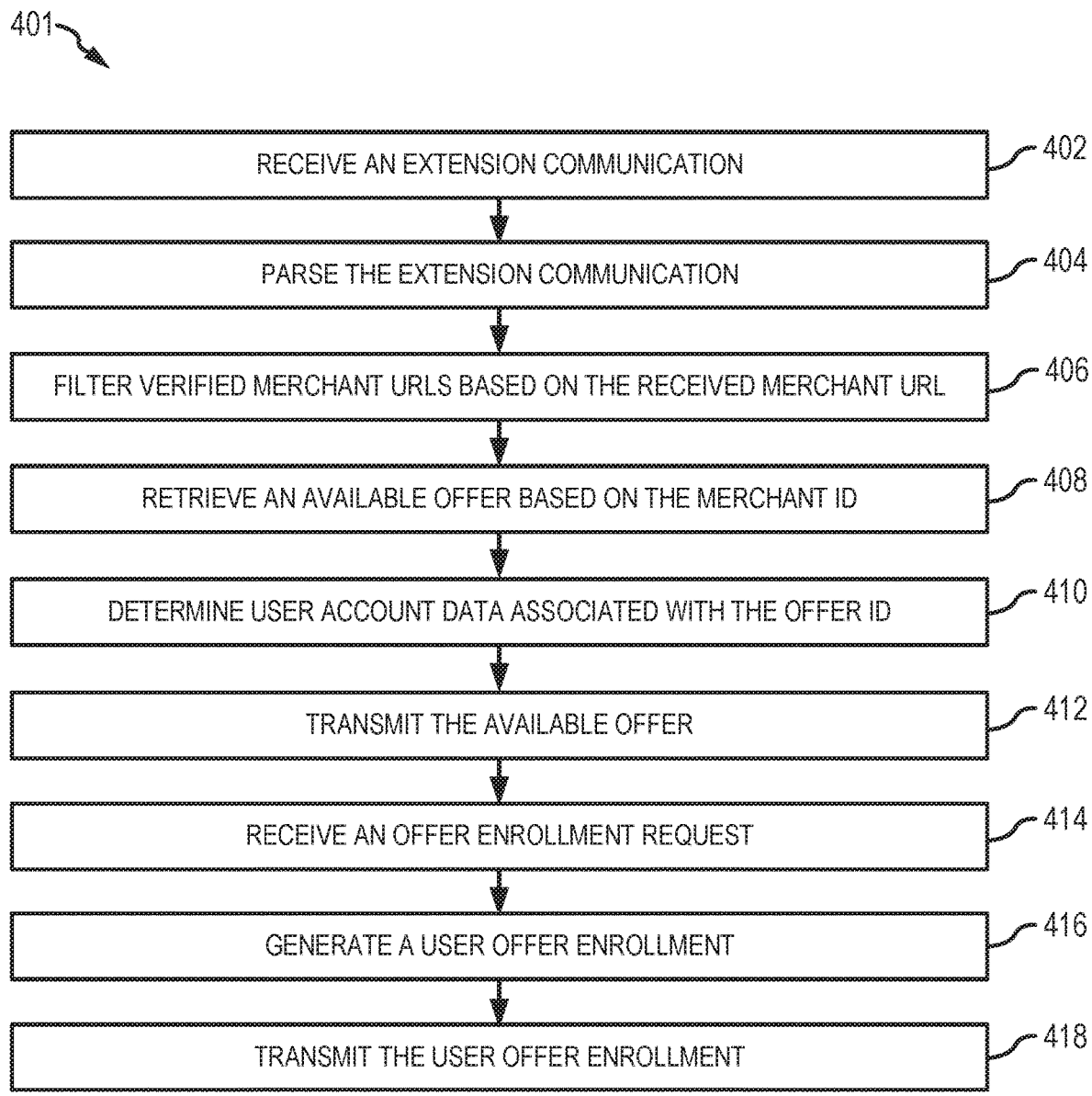
FIG. 4 illustrates a process flow for a method of enrolling in an offer, in accordance with various embodiments.
Figure 5:
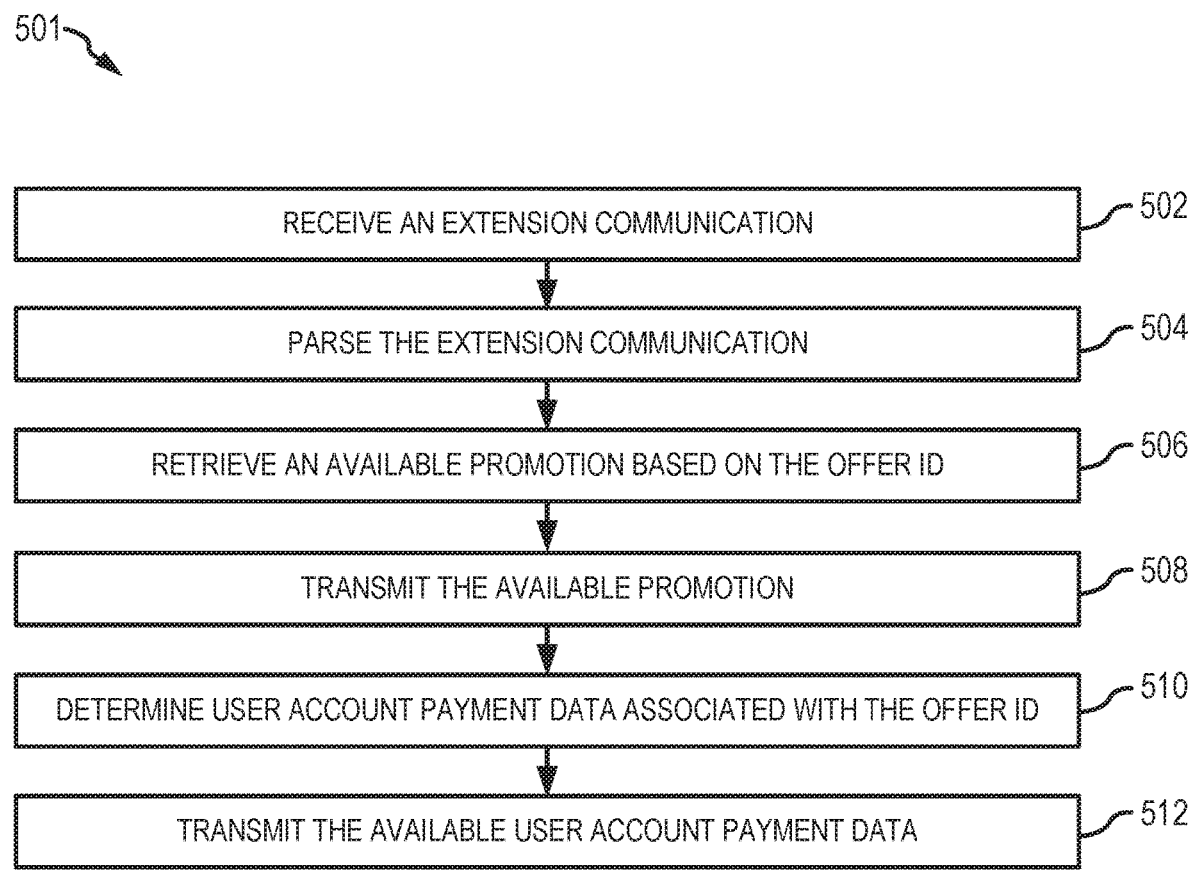
FIG. 5 illustrates a process flow for a method of enrolling in a promotion, in accordance with various embodiments.

Referring now to FIGS. 3-5 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-5, but also to the various system components as described above with reference to FIGS. 1 and 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, and with specific reference to FIG. 3, a method 301 for registering for automated transactional offers is disclosed. User device 110, via UI 120, may interact with offer extension 127 to generate the automated offer registration request. Method 301 may comprise issuer system 140 receiving an automated offer registration request (step 302). Issuer system 140 may receive the automated offer registration request from UI 120. The automated offer registration request may comprise user identifying data (e.g., username, password, biometric input, knowledge based authentication (KBA), etc.), a registration account (e.g., the transaction account the user wants to register for use), interface data (e.g., the type of browser), and/or the like. In response to generating the automated offer registration request, UI 120 may transmit the automated offer registration to issuer system 140.

Method 301 may include authorizing the automated offer registration request (step 304). Issuer system 140 may be configured to authorize the automated offer registration request using any suitable technique or process. For example, issuer system 140 may authorize the automated offer registration request by verifying the user identifying data against stored user data or checking with other databases, determining that the user has authority to submit the request (e.g., based on the verified user identifying data), verifying that UI 120 is supported (e.g., based on the interface data), and/or the like.

Method 301 may include generating an offer ID (step 306). For example, in response to authorizing the automated offer extension registration request, issuer system 140 may invoke tokenization engine 145 to generate an offer ID. Tokenization engine 145 may generate the offer ID using any suitable process or technique. The offer ID may comprise a unique identifier, token, public guID, or the like identifying the user registering for automated transactional offers. In various embodiments, the offer ID may also be encrypted, using any suitable encryption process. In response to generating the offer ID, tokenization engine 145 may return the offer ID to issuer system 140.

Method 301 may include associating the offer ID with the automated offer registration request (step 308). For example, in response to receiving the offer ID, issuer system 140 may generate a user record in registration database 143. The user record may comprise data from the automated offer registration request. Issuer system 140 may store the offer ID with the user record to associate the offer ID with the automated offer registration request.

Method 301 may include transmitting the offer ID (step 310). Issuer system 140 may be configured to transmit the offer ID to UI 120 (or offer extension 127), via user device 110. User device 110 may store the offer ID in UI storage 123. For example, and in accordance with various embodiments, UI 120 may comprise an application programming interface (API) (e.g., an extension storage API) configured to enable one or more extensions of UI 120 to store and retrieve data from UI storage 123. In response to receiving the offer ID, offer extension 127 may invoke the API (e.g., by transmitting the offer ID to the API). In response to being invoked, the API may transmit and store the offer ID in UI storage 123. In various embodiments, offer extension 127, and/or UI 120, may store the offer ID in UI storage 123 using any other suitable process or technique. The offer ID may enable the user to continue to interact with the system without needing to continually login or present user credentials.

In various embodiments, and with specific reference FIG. 4, a method 401 for enrolling in an offer is disclosed. Method 401 may include receiving an extension communication (step 402). Offer system 150 may receive the extension communication 201 from offer extension 127 of UI 120. For example, in response to user device 110 accessing and/or interacting with UI 120 (e.g., by navigating to a URL via a web browser), offer extension 127 may capture the website URL presented by UI 120. In various embodiments, the website URL may be captured for each website the user navigates to via UI 120. In various embodiments, offer extension 127 may capture the website URL for a given domain once, and navigation to sub-pages within the same domain may be ignored. For example, in response to the user accessing a merchant website associated with merchant system 130, the captured website URL may comprise a merchant URL. Offer extension 127 may generate the extension communication 201 to comprise the offer ID and the merchant URL. In response to generating the extension communication 201, offer extension 127 may transmit the extension communication 201 to offer system 150.

Method 401 may include parsing the extension communication (step 404). For example, offer system 150, via orchestration engine 255, may receive the extension communication 201. In response to receiving the extension communication 201, offer system 150, via orchestration engine 255, may parse the extension communication 201 to determine the merchant URL and the offer ID. For example, the extension communication 201 may comprise a note, tag, header, or the like indicating the data that comprises the merchant URL and the data that comprises the offer ID. The extension communication 201 may also comprise any other type of data field of operation to identity the data that comprises the merchant URL and the data that comprises the offer ID.

Method 401 may include filtering verified merchant URLs based on the received merchant URL (step 406). In response to determining the merchant URL, offer system 150, via orchestration engine 255, may invoke filter engine 260 by transmitting the merchant URL to filter engine 260. In response to being invoked, filter engine 260 may query merchant database 253 to locate one or more verified merchant URLs based on the determined merchant URL. In response to locating a verified merchant URL at least partially matching the determined merchant URL, filter engine 260 may retrieve a merchant ID associated with the verified merchant URL. For example, and in accordance with various embodiments, locating a verified merchant URL may comprise determining or at least partially matching a verified merchant URL with the determined merchant URL. For example, the parent domain of the determined merchant URL may be compared with the parent domain of the verified merchant URL to determine a match. In response to determining the verified merchant URL at least partially matching the determined merchant URL, filter engine 260 may determine and/or retrieve the merchant ID associated with the verified merchant URL.

Method 401 may include retrieving an available offer based on the merchant ID (step 408). In response to determining the merchant ID, filter engine 260 may query offer database 265 based on the merchant ID. Filter engine 260 may be configured to retrieve all or any subset of available offers in offer database 265 that are associated with the merchant ID. In response to retrieving at least one available offer, filter engine 260 may return the available offer and the merchant ID to orchestration engine 255. Filter engine 260 may further filter offers based on user preferences, user data, account information, user historical data, merchant preferences, etc.

Method 401 may include determining user account data associated with the offer ID (step 410). For example, offer system 150, via orchestration engine 255, may invoke retrieval engine 270 to determine the user account data by transmitting the offer ID to retrieval engine 270. In response to being invoked, retrieval engine 270 may transmit the offer ID to issuer system 140. In response to receiving the offer ID, issuer system 140 may query registration database 143 based on the offer ID to determine the user account data associated with the offer ID. Issuer system 140 may retrieve the user account data and return the user account data to offer system 150, via retrieval engine 270. In response to receiving the user account data, retrieval engine 270 may return the user account data to orchestration engine 255.

Method 401 may include transmitting the available offer (step 412). Offer system 150, via orchestration engine 255, may transmit the available offer to offer extension 127. In response to receiving the available offer, UI 120 may display the available offer via user device 110. For example, UI 120 may display the available offer as a web popup, an iFrame, in a new browsing window, and/or through any other suitable means. A user, via user device 110, may interact with UI 120 to accept or decline the available offer (e.g., by clicking on an "enroll" or "accept" button or image, and/or the like). In response to the user accepting the available offer, UI 120, via offer extension 127, may generate an offer enrollment request, comprising the offer ID and the available offer. UI 120 may also confirm enrollment with the user (e.g., display an offer enrollment confirmation). UI 120, via offer extension 127, may transmit the offer enrollment request to offer system 150. In response to the user declining the available offer, UI 120 may close the web popup, the iFrame, the new browsing window, or the like.

Method 401 may include receiving an offer enrollment request (step 414). Offer system 150, via orchestration engine 255, may receive the offer enrollment request. In response to receiving the offer enrollment request, offer system 150, via orchestration engine 255, may invoke offer enrollment engine 280 to complete the offer enrollment (e.g., by transmitting the offer enrollment request and the user account data (obtained above in step 410) to offer enrollment engine 280. Method 401 may include generating a user offer enrollment (step 416). For example, in response to being invoked offer enrollment engine 280 may generate the user offer enrollment to comprise the user account data, the available offer, and the merchant ID. Method 401 may include transmitting the user offer enrollment (step 418). Offer system 150, via offer enrollment engine 280, may transmit the user offer enrollment to issuer system 140. In response to receiving the user offer enrollment, issuer system 140 may associate the available offer with the user account data. In that regard, in response to the user completing a transaction with merchant system 130 according to the terms of the available offer, issuer system 140 may apply the offer during initiation, authorization, payment, settlement or any other phase of the transaction.

In various embodiments, and with specific reference to FIG. 5, a method 501 for enrolling in a promotion is disclosed. Method 501 may include receiving an extension communication 201 (step 502). Offer system 150 may be configured to receive the extension communication 201. For example, offer extension 127 may generate the extension communication 201 in response to a user accessing UI 120 (e.g., opening the web browser). The extension communication 201 may comprise the offer ID. In response to the user navigating to a website, offer extension 127 may capture the website URL and generate the extension communication 201 to also comprise the captured URL. Offer extension 127 may transmit the extension communication 201 to offer system 150, via orchestration engine 255.

Method 501 may include parsing the extension communication 201 (step 504). For example, in response to receiving the extension communication 201, offer system 150, via orchestration engine 255, may parse the extension communication 201 to determine the captured URL and the offer ID.

Method 501 may include retrieving an available promotion based on the extension ID (step 506). For example, in response to determining the offer ID, orchestration engine 255 may invoke filter engine 260 to retrieve one or more available promotions. Filter engine 260 may be configured to query offer database 265 to retrieve one or more available promotions. In response to retrieving at least one available promotion, filter engine 260 may return the available promotion to orchestration engine 255.

Method 501 may include transmitting the available promotion (step 508). Offer system 150, via orchestration engine 255, may transmit the available promotion to UI 120, via user device 110. In response to receiving the available promotion, UI 120 may display the available promotion via user device 110. For example, UI 120 may display the available promotion using a popup window, an iFrame, in a new browsing window, and/or the like. In various embodiments, the displayed available promotion may comprise a method for the user to enroll in the promotion. For example, the displayed available promotion may comprise a phone number to call to enroll in the promotion. As a further example, the displayed available promotion may comprise an enrollment link, button, image, or the like configured to redirect UI 120 to a URL wherein the user may enroll in the promotion (e.g., a URL hosted by issuer system 140, merchant system 130, etc.).

Method 501 may include determining user account payment data associated with the extension ID (step 510). For example, in response to determining the offer ID, orchestration engine 255 may invoke retrieval engine 270 to determine the user account data. The user account data may comprise an account balance, a payment due date, a payment minimum amount, a payment statement balance, and/or the like. For example, in response to being invoked retrieval engine 270 may transmit the offer ID to issuer system 140. Issuer system 140 may query registration database 143 to determine the user account data associated with the offer ID. Issuer system 140 may retrieve the user account data and may determine the user account payment data from internal databases and systems based on the user account data. Issuer system 140 may return the user account payment data to offer system 150, via retrieval engine 270. In response to receiving the user account payment data, retrieval engine 270 may return the user account payment data to orchestration engine 255.

Method 501 may include transmitting the user account payment data (step 512). Offer system 150, via orchestration engine 255, may transmit the user account payment data to UI 120, via user device 110. In response to receiving the user account payment data, UI 120 may display the user account payment data via user device 110. For example, UI 120 may display the user account payment data as a popup window, an iFrame, in a new browsing window, and/or the like. In various embodiments, the displayed user account payment data may comprise a method for the user to initiate a payment. For example, the displayed user account payment data may comprise a payment link, button, image, or the like configured to redirect UI 120 to a URL wherein the user may review and/or complete a payment on the user's transaction account. A user, via user device 110, may interact with UI 120 to pay or decline making a payment at that time (e.g., by clicking on a "pay," "pay later," "decline payment" button, and/or the like). For example, the URL may be hosted by issuer system 140, and in response to UI 120 redirecting to the URL, UI 120 may prompt the user to enter user credentials to access the user's transaction account data. UI 120 may communicate with issuer system 140 to verify and authenticate the user credentials, and provide the user access to review and complete payment based on the user account payment data.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "eBook," an "eMagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, social media network, and/or location based service. Distribution channels may include at least one of a merchant website, a social media site, affiliate or partner websites, and an external vendor. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system 100 may be implemented as micro-applications or micro-apps. Micro-apps are typically deployed in the context of an operating system, including for example, a WINDOWS® operating system, an APPLE® iOS operating system, and the like. The micro-app may be configured to leverage the resources of the larger operating system and associated hardware via a set of predetermined rules which govern the operations of various operating systems and hardware resources. For example, where a micro app desires to communicate with a device or network other than the device or operating system, the micro app may leverage the communication protocol of the operating system and associated device hardware under the predetermined rules of the operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIB- UTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method comprising:
   registering, by a computing device, a uniform resource locator (URL) associated with a merchant system as a verified merchant URL with an offer program provided by an offer system, wherein the verified merchant URL is assigned to a merchant ID;
   receiving, by the computing device, an extension communication from a browser extension executed on a client device of a user having a user account registered with the offer program, wherein the extension communication is generated in response to the client device navigating to a merchant URL via a user interaction with a user interface of the client device;
   determining, by the computing device, a captured merchant URL, an offer ID, and the user account of the user based at least in part on the extension communication, wherein the browser extension stores the offer ID, wherein the offer ID is a unique identifier indicating the user account is registered to receive an available offers from the offer system;
   comparing, by the computing device, a parent domain of the captured merchant URL and a parent domain of at least one of a plurality of verified merchant URLs;
   determining, by the computing device, the merchant ID is associated with the captured merchant URL based at least in part on the comparing;
   retrieving, by the computing device, the available offer based at least in part on the merchant ID;
   causing, by the computing device, a display of the available offer on the client device;
   receiving, by the computing device, an offer enrollment request from the browser extension of the client device based at least in part on a selection of the available offer on the client device; and
   transmitting, by the computing device, a user offer enrollment to an issuer system, the user offer enrollment comprising user account data associated with the user account.

2. The method of claim 1, further comprising:
   determining, by the computing device, the user account of the user from the extension communication based at least in part on the offer ID.

3. The method of claim 2, further comprising:
   determining, by the computing device, user account payment data based at least in part on the offer ID.

4. The method of claim 3, wherein the user account payment data comprises at least one of:
   an account balance, a payment due date, a payment minimum amount, or a payment statement balance.

5. The method of claim 1, further comprising:
   determining, by the computing device, user account payment data associated with the user account; and
   causing, by the computing device, a display of the user account payment data on the client device.

6. The method of claim 1, wherein the display of the available offer occurs as at least one of a web popup, an iFrame, or a new browsing window.

7. The method of claim 1, further comprising:
   registering, by the computing device, the user account for the user; and
   causing, by the computing device, an installation of the browser extension on the client device in response to the user account being registered.

8. A system comprising:
   a computing device comprising a processor and a memory; and
   program instructions stored in the memory that, when executed by the processor, cause the computing device to at least:
      register a uniform resource locator (URL) associated with a merchant system as a verified merchant URL with an offer program provided by an offer system, wherein the verified merchant URL is assigned to a merchant ID;
      receive an extension communication from a browser extension executed on a client device of a user having a user account registered with the offer program, wherein the extension communication is generated in response to the client device navigating to a merchant URL via a user interaction with a user interface of the client device;
      determine a captured merchant URL, an offer ID, and the user account of the user based at least in part on the extension communication, wherein the browser extension stores the offer ID, wherein the offer ID is a unique identifier indicating the user account is registered to receive an available offers from the offer system;
      compare a parent domain of the captured merchant URL and a parent domain of at least one of a plurality of verified merchant URLs;
      determine the merchant ID is associated with the captured merchant URL based at least in part on the compare;
      retrieve the available offer based at least in part on the merchant ID;
      cause a display of the available offer on the client device;
      receive an offer enrollment request from the browser extension of the client device based at least in part on a selection of the available offer on the client device; and
      transmit a user offer enrollment to an issuer system, the user offer enrollment comprising user account data associated with the user account.

9. The system of claim 8, wherein the program instructions stored in the memory that, when executed by the processor, cause the computing device to at least:
   determine the user account of the user from the extension communication based at least in part on the offer.

10. The system of claim 9, wherein the program instructions stored in the memory that, when executed by the processor, cause the computing device to at least:
    determine user account payment data based at least in part on the offer ID.

11. The system of claim 10, wherein the user account payment data comprises at least one of:
    an account balance, a payment due date, a payment minimum amount, or a payment statement balance.

12. The system of claim 8, wherein the program instructions stored in the memory that, when executed by the processor, cause the computing device to at least:
   determine user account payment data associated with the user account; and
   cause a display of the user account payment data on the client device.

13. The system of claim 8, wherein the display of the available offer occurs as at least one of a web popup, an iFrame, or a new browsing window.

14. The system of claim 8, wherein the program instructions stored in the memory that, when executed by the processor, cause the computing device to at least:
   register the user account for the user; and
   cause an installation of the browser extension on the client device in response to the user account being registered.

15. The system of claim 8, wherein the program instructions stored in the memory that, when executed by the processor, cause the computing device to at least:
   identify a transaction with the merchant system for the user account; and
   apply the available offer as part of a completion of the transaction based at least in part on the user account data associated with the user account.

16. A non-transitory computer readable-storage medium having instructions stored thereon that, in response to execution by a processor of a computing device, cause the computing device to at least:
   register a uniform resource locator (URL) associated with a merchant system as a verified merchant URL with an offer program provided by an offer system, wherein the verified merchant URL is assigned to a merchant ID;
   receive an extension communication from a browser extension executed on a client device of a user having a user account registered with the offer program, wherein the extension communication is generated in response to the client device navigating to a merchant URL via a user interaction with a user interface of the client device;
   determine a captured merchant URL, an offer ID, and the user account of the user based at least in part on the extension communication, wherein the offer browser extension stores the offer ID, wherein the offer ID is a unique identifier indicating the user account is registered to receive an available offers from the offer system;
   compare a parent domain of the captured merchant URL and a parent domain of at least one of a plurality of verified merchant URLs;
   determine the merchant ID is associated with the captured merchant URL based at least in part on the compare;
   retrieve the available offer based at least in part on the merchant ID;
   cause a display of the available offer on the client device;
   receive an offer enrollment request from the browser extension of the client device based at least in part on a selection of the available offer on the client device; and
   transmit a user offer enrollment to an issuer system, the user offer enrollment comprising user account data associated with the user account.

17. The non-transitory computer readable storage medium of claim 16, wherein the instructions, in response to execution by the processor, cause the computing device to at least:
   determine the user account of the user from the extension communication based at least in part on the offer ID.

18. The non-transitory computer readable storage medium of claim 16, wherein the instructions, in response to execution by the processor, cause the computing device to at least:
   determine user account payment data based at least in part on the offer ID.

19. The non-transitory computer readable-storage medium of claim 18, wherein the user account payment data comprises at least one of:
   an account balance, a payment due date, a payment minimum amount, or a payment statement balance.

20. The non-transitory computer readable storage medium of claim 16, wherein the instructions, in response to execution by the processor, cause the computing device to at least:
   determine user account payment data associated with the user account; and
   cause a display of the user account payment data on the client device.

* * * * *